UNITED STATES PATENT OFFICE.

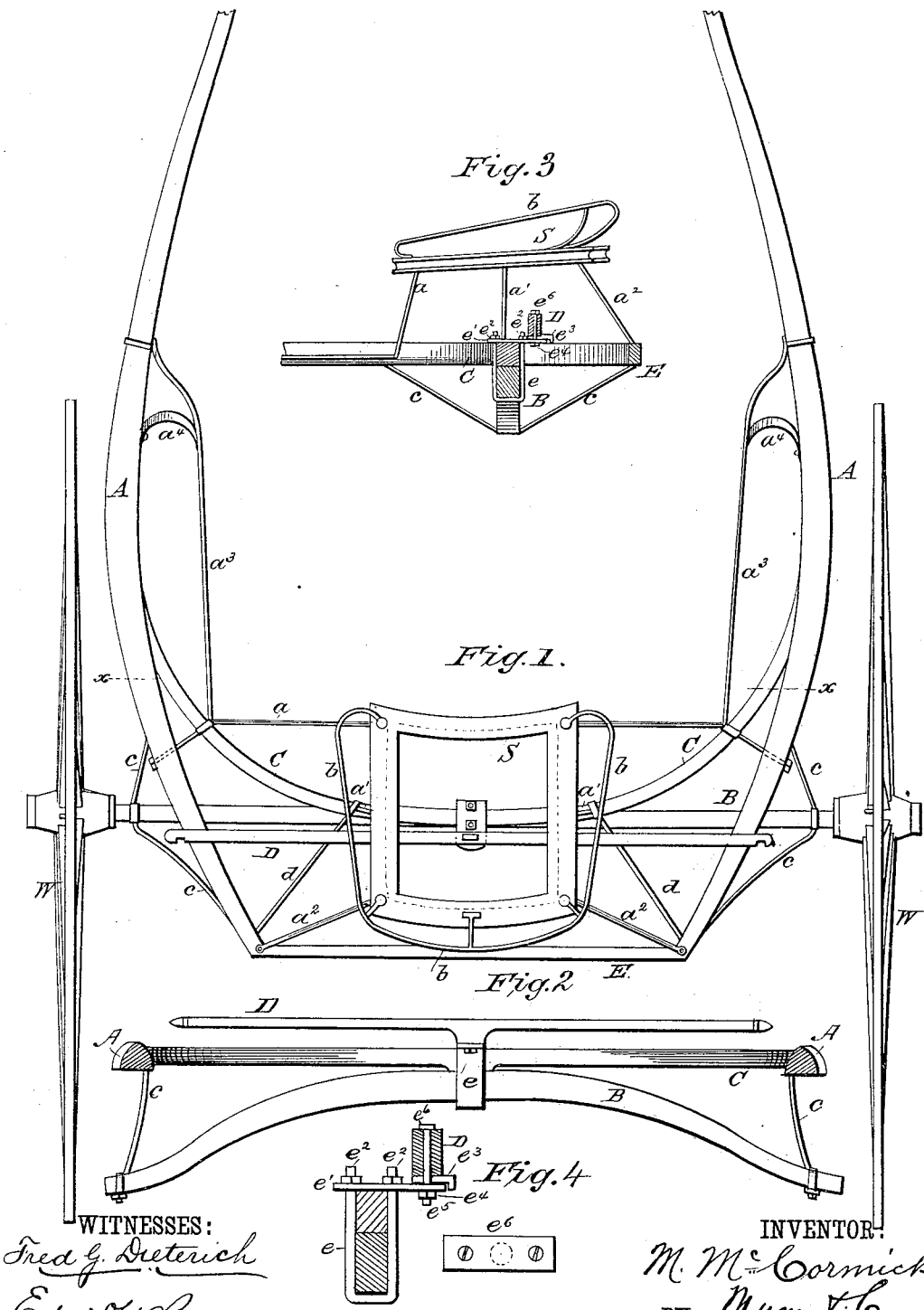

MOSES McCORMICK, OF CALVERTON, MARYLAND.

SULKY.

SPECIFICATION forming part of Letters Patent No. 377,045, dated January 31, 1888.

Application filed May 6, 1887. Serial No. 237,327. (No model.)

*To all whom it may concern:*

Be it known that I, MOSES MCCORMICK, of Calverton, in the county of Baltimore and State of Maryland, have invented a new and useful Improvement in Sulkies, of which the following is a specification.

My invention relates to trotting-sulkies; and it consists in the improved construction and arrangement of parts, whereby the horse may be hitched closer to the driver's seat and the sulky made lighter, less complicated, and stiffer, as will be hereinafter fully described.

Figure 1 is a plan view. Fig. 2 is a rear view of the frame-work, partly in section, through line $x\ x$. Fig. 3 is a side elevation, partly in section; and Fig. 4 are detail views of the parts for connecting the axle, circle-bar, and whiffletree.

In the drawings, A A represent the shafts, B the axle, and W W the wheels. The shafts extend across the axle and are connected in the rear by cross-bar E, and are supported upon the axle by braces $c\ c$ and $d$. The axle B is bent upwardly or arched, as shown in Fig. 2, until its upper edge reaches the level of the lower surface of the shafts, and the circle-bar C, which rests in the horizontal plane of the shafts, has its forward ends firmly connected at an acute angle to the shafts, and at its rear end is carried back to and rests upon the top of the highest part of the axle. At this point the circle C and axle B are firmly fastened together by a U-shaped clip, $e$, which embraces the axle and also the circle, and has its upper ends screw-threaded and extended through a rearwardly-projecting plate, $e'$. This plate is made to subserve the double function of a yoke-piece to hold the axle and circle together when fastened down by the nuts $e^2$, and also a bearing-plate upon which is mounted the singletree D. This singletree has a flanged plate, $e^3$, on its lower side, where it rests upon plate $e'$, and also a pivot-bolt, $e^5$, which has an elongated head, $e^6$, above the singletree, firmly fastened to it by two screws. This pivot-bolt extends through the plate $e'$, and is secured thereto by the nut $e^4$ underneath. It will therefore be seen that the singletree is so attached that the draft is directly transmitted to the circle C and the axle, which is the strongest part of the sulky-frame.

The seat S has the usual rail, $b$, and is supported upon standards $a\ a'\ a^2$, while foot-holds $a^4$ are arranged beside the shafts inside of longitudinal braces $a^3$.

I am aware that it is not broadly new to curve the axle upwardly and connect it in the middle to the circle-bar and the whiffletree, and I therefore only claim the peculiar construction and arrangement of coupling devices for these parts, as shown and described.

Having thus described my invention, what I claim as new is—

The combination, with the shafts A, the upwardly-arched axle B, and the circle-bar C, having its forward ends attached to the shafts and its rear middle portion resting above the axle, of the U-shaped clip $e$, embracing both the axle and circle-bar and having its upper ends screw-threaded, the rearwardly-extending plate $e'$, forming a yoke-piece for the clip and also a bearing-plate for the whiffletree, and the whiffletree D, mounted upon the rear end of the yoke-plate and connected to it by a pivot-bolt, substantially as shown and described.

MOSES McCORMICK.

Witnesses:
SAML. S. PLEASANTS,
W. S. WILKINSON.